(12) United States Patent
Yamaguchi (10) Patent No.: US 9,443,145 B2
(45) Date of Patent: Sep. 13, 2016

(54) PERSON RECOGNITION APPARATUS, PERSON RECOGNITION METHOD, AND NON-TRANSITORY COMPUTER READABLE RECORDING MEDIUM

(71) Applicant: FUJIFILM CORPORATION, Tokyo (JP)

(72) Inventor: Yoshihiro Yamaguchi, Tokyo (JP)

(73) Assignee: FUJIFILM Corporation, Tokyo (JP)

(*) Notice: Subject to any disclaimer, the term of this patent is extended or adjusted under 35 U.S.C. 154(b) by 55 days.

(21) Appl. No.: 14/499,931

(22) Filed: Sep. 29, 2014

(65) Prior Publication Data

US 2015/0092997 A1   Apr. 2, 2015

(30) Foreign Application Priority Data

Sep. 30, 2013  (JP) ................................. 2013-204252

(51) Int. Cl.
*G06K 9/00*  (2006.01)

(52) U.S. Cl.
CPC ....... *G06K 9/00677* (2013.01); *G06K 9/00221* (2013.01)

(58) Field of Classification Search
CPC .................. G06K 9/00677; G06K 9/00221
USPC .......................... 382/118, 173, 190
See application file for complete search history.

(56) References Cited

U.S. PATENT DOCUMENTS

| | | | | |
|---|---|---|---|---|
| 6,606,411 B1 * | 8/2003 | Loui | ................... | G06F 17/3025 382/165 |
| 7,286,723 B2 * | 10/2007 | Taugher | ............ | G06F 17/30247 382/305 |
| 7,920,760 B2 * | 4/2011 | Yoda | ................. | G06F 17/30265 358/1.15 |
| 8,044,945 B2 * | 10/2011 | Takamori | .......... | G06F 17/30256 345/204 |
| 8,452,059 B2 * | 5/2013 | Tang | ................... | G06K 9/00221 382/118 |
| 2008/0085036 A1 * | 4/2008 | Fukushi | ............. | G06K 9/00221 382/118 |
| 2009/0248703 A1 * | 10/2009 | Tsukagoshi | ......... | G06F 17/3028 |

FOREIGN PATENT DOCUMENTS

| | | |
|---|---|---|
| JP | 2006-244279 | 9/2006 |
| JP | 2010-237756 | 10/2010 |
| JP | 2012-027868 A | 2/2012 |

OTHER PUBLICATIONS

JP Office Action, dated Aug. 4, 2015; Application No. 2013-204252.

* cited by examiner

*Primary Examiner* — Samir Ahmed
(74) *Attorney, Agent, or Firm* — Young & Thompson (57) ABSTRACT

There are provided a person recognition apparatus, method, and a non-transitory computer readable recording medium which can perform accurate person recognition according to a time dependent face change. A sorting section sorts a plurality of images by shooting date and time. A group division section divides the plurality of images into a plurality of groups according to a predetermined shooting date and time range. A face recognition section extracts feature amounts by face recognition for each group. An in-group person determination section determines a person having a similarity of a predetermined reference threshold value or higher as the same person and integrates the feature amounts relevant to the person for each group. An inter-group person recognition section recognizes persons having a similarity of a predetermined recognition threshold value or higher as the same person between two groups based on the feature amounts integrated in adjacent groups.

15 Claims, 4 Drawing Sheets

PERSON RECOGNITION APPARATUS, PERSON RECOGNITION METHOD, AND NON-TRANSITORY COMPUTER READABLE RECORDING MEDIUM

CROSS-REFERENCE TO RELATED APPLICATIONS

The present application claims priority under 35 U.S.C. §119 to Japanese Patent Application No. 2013-204252, filed on Sep. 30, 2013, all of which are hereby expressly incorporated by reference into the present application.

BACKGROUND OF THE INVENTION

1. Field of the Invention

The present invention relates to a person recognition apparatus and a person recognition method, and in particular, relates to a person recognition apparatus and a person recognition method for performing person recognition according to a time dependent face change. In addition, the invention relates to a non-transitory computer readable recording medium that records a person recognition program causing a computer to execute such a person recognition method.

2. Description of the Related Art

In recent years, image data of faces having similar features has been grouped by performing face detection and face recognition of a large number of pieces of image data and persons appearing on the images have been automatically sorted into categories, such as a main character, a central figure, and others, based on the frequency of appearance of the similar faces, so that merchandise, such as a photo book that focuses on a main character or a central figure, can be created.

However, when the range of shooting dates and times of a large number of pieces of image data to be handled is a long period of time, for example, one to several years, the features of the face of a person may change over time. In particular, the features of the face of a child in childhood may change a lot in a year. For this reason, even if persons appearing on the images are actually the same person, the persons may not be recognized as the same person as a result of face recognition. In this case, it is difficult to accurately create a photo book or the like.

Therefore, JP2012-27868A discloses a method of extracting a face image feature amount by detecting a face region from image data and extracting shooting date information from the image data, sequentially updating a first identification element, which is an average of the face image feature amounts of a target person in a predetermined number of face images from the oldest shooting date, and a second identification element, which is an average of the face image feature amounts of the target person in a predetermined number of face images from the newest shooting date, and identifying the person using the updated identification elements.

According to the method disclosed in JP2012-27868A, since the first and second identification elements are updated, it is possible to perform person identification according to a time dependent change by performing face recognition sequentially from older image data or newer image data in time series.

SUMMARY OF THE INVENTION

However, according to the method disclosed in JP2012-27868A, a period between the shooting date of the first identification element and the shooting date of the second identification element becomes longer every time the identification elements are updated. Therefore, for image data having a shooting date between the shooting date of the first identification element and the shooting date of the second identification element, accurate face recognition cannot be performed even if the first identification element is used or the second identification element is used because the shooting date is far from the shooting date of the first identification element and the shooting date of the second identification element.

In addition, the average of the face image feature amounts in a predetermined number of face images from the oldest shooting date is the first identification element and the average of the face image feature amounts in a predetermined number of face images from the newest shooting date is the second identification element. For this reason, when the averaged period of the shooting dates of a predetermined number of face images is long, the features of the face change during the period. Therefore, since accurate identification elements cannot be acquired, it may be difficult to accurately identify the target person.

The invention has been made to solve such problems in the related art, and it is an object of the invention to provide a person recognition apparatus and a person recognition method capable of performing accurate person recognition according to a time dependent face change.

In addition, it is another object of the invention to provide a non-transitory computer readable recording medium that records a person recognition program causing a computer to execute such a person recognition method.

According to an aspect of the invention, there is provided a person recognition apparatus including: a feature amount extraction and classification section that extracts feature amounts for respective persons by performing face recognition for a plurality of images and divides the extracted feature amounts into a plurality of groups based on shooting dates and times of the plurality of images; an in-group person determination section that determines persons whose similarity based on the feature amounts extracted by the feature amount extraction and classification section is equal to or higher than a predetermined reference threshold value as the same person for each group obtained by division of the feature amount extraction and classification section and integrates feature amounts relevant to the person for each of the groups; and an inter-group person recognition section that recognizes persons having a similarity of a predetermined recognition threshold value or higher as the same person between two groups having adjacent shooting dates and times based on feature amounts integrated by the in-group person determination section in the two groups.

The feature amount extraction and classification section may include a sorting section that sorts the plurality of images by shooting date and time, a group division section that divides the plurality of images sorted by the sorting section into a plurality of groups according to a predetermined shooting date and time range, and a face recognition section that extracts a feature amount for each person by performing face recognition for each of the groups obtained by division of the group division section.

Preferably, the person recognition apparatus further includes a data integrating section that, for persons recognized as the same person between the two groups by the inter-group person recognition section, further integrates both feature amounts integrated in the two groups when a difference between both the feature amounts is equal to or less than a predetermined integration threshold value. It is preferable that, after feature amounts are integrated between the two groups having adjacent shooting dates and times by the inter-group person recognition section, when a difference of feature amounts between the two groups and another group having more adjacent shooting date and time is equal to or less than a predetermined integration threshold value, the data integrating section integrate a feature amount integrated between the two groups and a feature amount in another group.

In addition, the inter-group person recognition section may use, as the predetermined recognition threshold value, the same value as the predetermined reference threshold value.

The in-group person determination section may integrate feature amounts by calculating an average value of feature amounts relevant to a person determined as the same person.

The in-group person determination section may determine whether or not a person determined as the same person is a main person and integrate feature amounts when it is determined that the person determined as the same person is a main person.

According to another aspect of the invention, there is provided a person recognition method including: extracting feature amounts for respective persons by performing face recognition for a plurality of images and dividing the extracted feature amounts into a plurality of groups based on shooting dates and times of the plurality of images; determining persons whose similarity based on the extracted feature amounts is equal to or higher than a predetermined reference threshold value as the same person for each of the separate groups and integrating feature amounts relevant to the person for each of the groups; and recognizing persons having a similarity of a predetermined recognition threshold value or higher as the same person between two groups having adjacent shooting dates and times based on feature amounts integrated in the two groups.

A size of at least one of a predetermined shooting date and time range, the predetermined reference threshold value, and the predetermined recognition threshold value may be adjusted according to at least one of age, race, and sex of a person who is a target of recognition.

In addition, a size of at least one of the predetermined reference threshold value and the predetermined recognition threshold value may be adjusted according to the predetermined shooting date and time range.

According to still another aspect of the invention, there is provided a person recognition program causing a computer to execute: a step of extracting feature amounts for respective persons by performing face recognition for a plurality of images and dividing the extracted feature amounts into a plurality of groups based on shooting dates and times of the plurality of images; a step of determining persons whose similarity based on the extracted feature amounts is equal to or higher than a predetermined reference threshold value as the same person for each of the separate groups and integrating feature amounts relevant to the person for each of the groups; and a step of recognizing persons having a similarity of a predetermined recognition threshold value or higher as the same person between two groups having adjacent shooting dates and times based on feature amounts integrated in the two groups.

According to still another aspect of the invention, there is provided a non-transitory computer readable recording medium on which the person recognition program described above is recorded.

According to the invention, a plurality of images sorted by shooting date and time are divided into a plurality of groups according to a predetermined shooting date and time range. Feature amounts obtained by face recognition are extracted for each of the separate groups, persons having a similarity of a predetermined reference threshold value or higher are determined as the same person, and feature amounts relevant to the person are integrated for each group. Persons having a similarity of a predetermined recognition threshold value or higher are recognized as the same person between two groups of adjacent shooting dates and times based on the feature amounts integrated in the two groups. Therefore, it is possible to perform accurate person recognition according to a time dependent face change.

DESCRIPTION OF THE PREFERRED EMBODIMENTS

Hereinafter, an embodiment of the invention will be described with reference to the accompanying diagrams.

Figure 1:
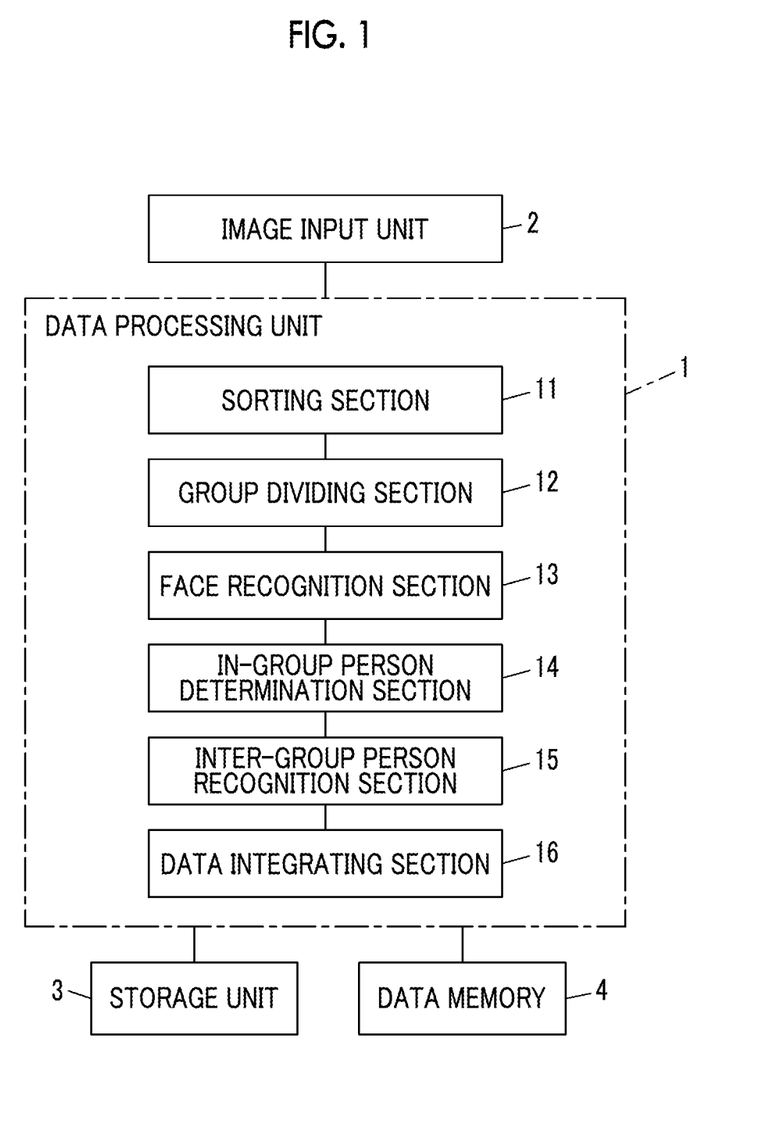
FIG. 1 is a block diagram showing the configuration of a person recognition apparatus according to an embodiment of the invention.

FIG. 1 shows a person recognition apparatus according to an embodiment of the invention. The person recognition apparatus has a configuration in which an image input unit 2, a storage unit 3, and a data memory 4 are connected to a data processing unit 1. The data processing unit 1 performs person recognition according to a time dependent face change by processing a plurality of images input from the image input unit 2.

The data processing unit 1 includes a sorting section 11, and a face recognition section 13 is connected to the sorting section 11 through a group division section 12. In the present embodiment, a feature amount extraction and classification section is formed by the sorting section 11, the group division section 12 and the face recognition section 13. An in-group person determination section 14 and an inter-group person recognition section 15 are sequentially connected to the face recognition section 13, and a data integrating section 16 is connected to the inter-group person recognition section 15. The data processing unit 1 is formed by the sorting section 11, the group division section 12, the face recognition section 13, the in-group person determination section 14, the inter-group person recognition section 15, and the data integrating section 16.

The sorting section 11 rearranges a plurality of images input to the data processing unit 1 from the image input unit 2 by sorting the plurality of images by the shooting date and time based on shooting date and time data in exchangeable image file format (Exif) tag information given to each image.

The group division section 12 divides a plurality of images sorted by the sorting section 11 into a plurality of groups according to a predetermined shooting date and time range. That is, the plurality of images sorted by the sorting section 11 are grouped according to a set period.

The face recognition section 13 performs face detection and face recognition for a plurality of images in each group obtained by division of the group division section 12, and extracts the feature amount of the face for each person appearing on the images. Here, the feature amount of the face represents information regarding the position, the shape, and the size of face parts such as eyes, nose, and mouth, and the shape of the contour of the face, and can be extracted as a scalar quantity based on the position of a corresponding pixel in an image or as a vector value having a position of each pixel as its elements. In addition, the feature amount can be calculated as a vector value having a size of each complex Fourier component, which is obtained by the Fourier transform of an image, as its elements.

The in-group person determination section 14 determines persons whose similarity based on the feature amounts extracted from a plurality of images by the face recognition section 13 is equal to or higher than a reference threshold value Th1, among persons appearing on the images of each group, as the same person. In addition, the in-group person determination section 14 integrates the plurality of feature amounts extracted from the respective images for the person determined as the same person, and sets the result as the feature amount of the person in the group.

Among persons whose feature amounts are integrated by the in-group person determination section 14 in each of two groups having adjacent shooting dates and times, the inter-group person recognition section 15 recognizes persons whose similarity based on the integrated feature amounts is equal to or higher than a predetermined recognition threshold value Th2 as the same person between the two groups.

Here, the similarity can be calculated based on the difference between two feature amounts to be compared. It is assumed that the larger the difference between feature amounts, the lower the similarity, and the smaller the difference between feature amounts, the higher the similarity.

For persons recognized as the same person between two groups having adjacent shooting dates and times by the inter-group person recognition section 15, when the difference between both feature amounts integrated in the respective groups is equal to or lower than a predetermined integration threshold value Th3, the data integrating section 16 integrates the feature amounts of the two groups into one feature amount and sets the result as the feature amount of the person in the two groups.

In addition, it is assumed that the integration of feature amounts is to obtain one average value as a representative value by averaging the feature amounts, for example. Here, the average value can be calculated by various averaging operations, such as arithmetic averaging, geometric averaging, harmonic averaging, and weighted averaging considering a period corresponding to each feature amount. When feature amounts are expressed as vector values, the feature amounts can be integrated by calculating the average of the vector values. Other than the average values, a plurality of feature amounts can also be integrated into one feature amount, such as a median, a maximum value, and a minimum value.

In addition, the image input unit 2 inputs image data of a plurality of images, for which person recognition according to a time dependent face change is to be performed, to the data processing unit 1.

A predetermined shooting date and time range used when the group division section 12 divides a plurality of images into groups, the predetermined reference threshold value Th1 used when the in-group person determination section 14 determines the same person in a group, the predetermined recognition threshold value Th2 used when the inter-group person recognition section 15 recognizes the same person between groups, and the predetermined integration threshold value Th3 used when the data integrating section 16 integrates the feature amounts of a plurality of groups are stored in the storage unit 3 in advance.

The data memory 4 stores various kinds of data obtained by the data processing unit 1, such as the feature amount of each person extracted by the face recognition section 13, the feature amount integrated by the in-group person determination section 14, and the feature amount integrated by the inter-group person recognition section 15.

Figure 2:
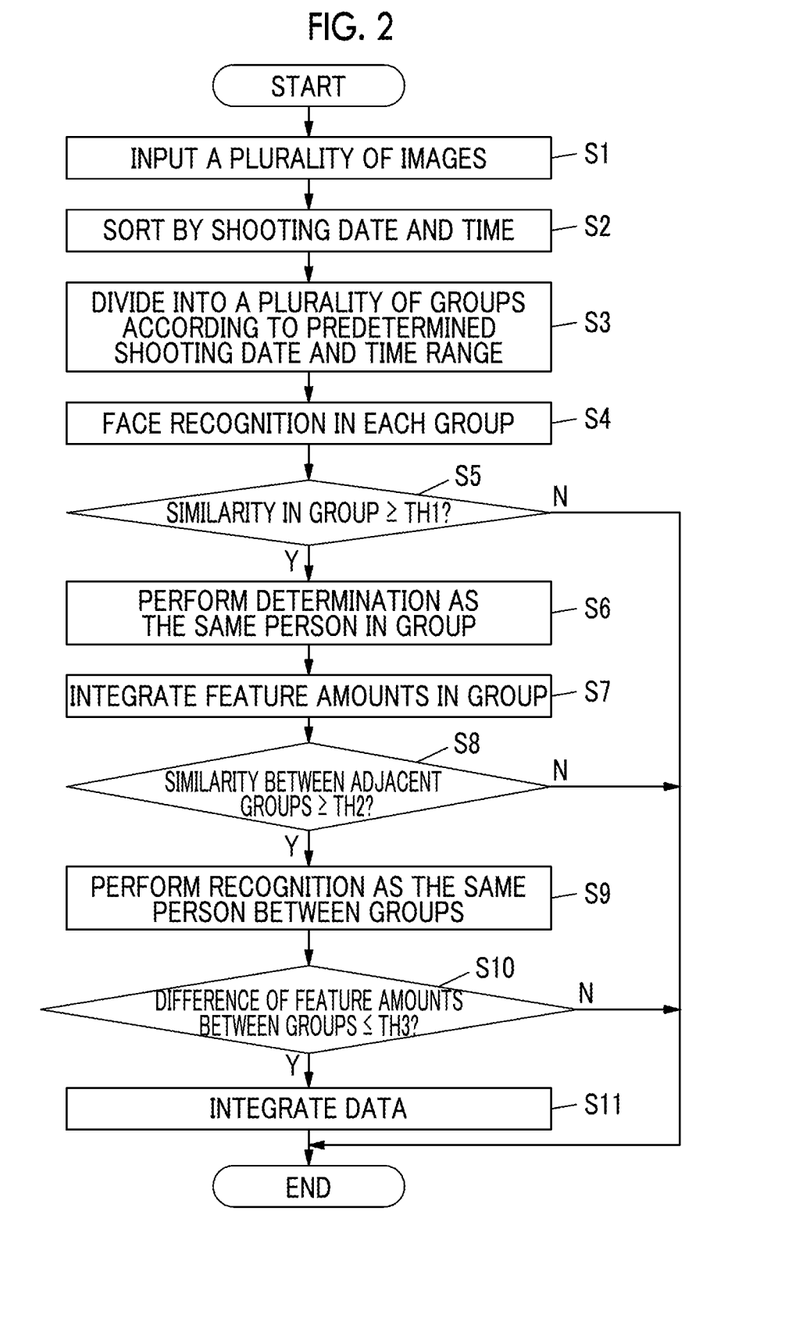
FIG. 2 is a flowchart showing a person recognition method executed by the person recognition apparatus of the embodiment.

Next, a person recognition method executed by the person recognition apparatus according to the embodiment will be described with reference to the flowchart in FIG. 2.

Figure 3:
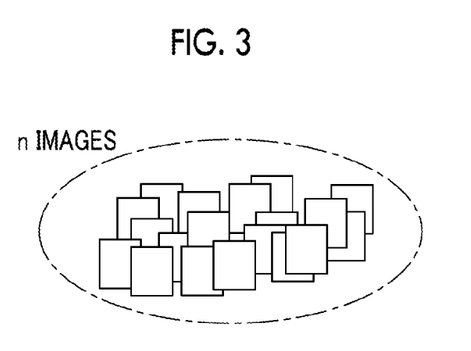
FIG. 3 is a diagram schematically showing a plurality of images input by an image input unit.

First, in step S1, a plurality of images are input to the data processing unit 1 through the image input unit 2. For example, as shown in FIG. 3, it is assumed that n images are input.

Figure 4:
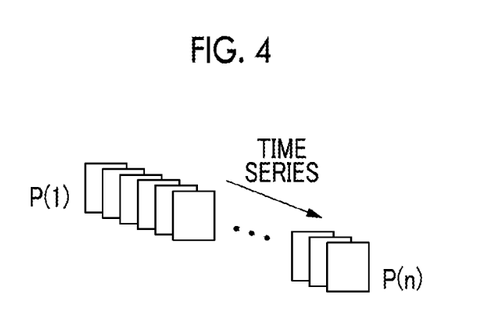
FIG. 4 is a diagram schematically showing a plurality of images sorted by shooting date and time by a sorting section.

In step S2, the n images input to the data processing unit 1 are sorted by shooting date and time by the sorting section 11 in the data processing unit 1. In this case, as shown in FIG. 4, the n images are rearranged as images P(1) to P(n) in time series based on the shooting date and time data of Exif tag information given to each image.

In step S3, the n images P(1) to P(n) sorted by the shooting date and time are divided into a plurality of groups according to a predetermined shooting date and time range by the group division section 12.

For example, it is assumed that the n images P(1) to P(n) were taken over a three-year period of 2011 to 2013, i images P(1) to P(i) from the oldest in time series were taken in 2011, next (j−i) images P(i+1) to P(j) were taken in 2012, and (n−j) images P(j+1) to P(n) were taken in 2013 (i and j are integers satisfying $1 < i < j < n$).

Figure 5:
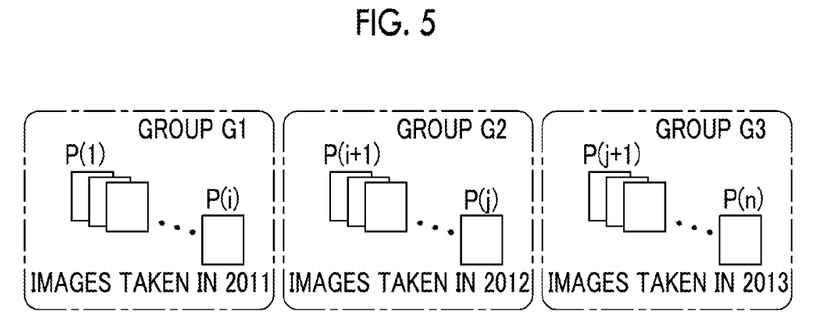
FIG. 5 is a diagram schematically showing a plurality of groups divided according to a shooting date and time range by a group division section.

In addition, when the predetermined shooting date and time range is set to 1 year, as shown in FIG. 5, the n images can be divided into three groups of a group G1 including the images P(1) to P(i) taken in 2011, a group G2 including images P(i+1) to P(j) taken in 2012, and a group G3 including the images P(j+1) to P(n) taken in 2013.

Then, in step S4, the face recognition section 13 performs face detection and face recognition for each image in the groups obtained by division of the group division section 12. That is, for each of the groups G1 to G3, the feature amounts of the faces of respective persons appearing on a plurality of images in the group are extracted, and are stored in the data memory 4.

Then, in step S5, the in-group person determination section 14 performs determination regarding the same person in a group. That is, the in-group person determination section 14 reads the predetermined reference threshold value Th1 from the storage unit 3, and determines whether or not a plurality of persons whose similarity based on the feature amounts is equal to or higher than the predetermined reference threshold value Th1 are present in each group based on the feature amounts of each person stored in the data memory 4. It is preferable that the in-group person determination section 14 perform the determination in the order of shooting date and time for a plurality of images in a group.

When a plurality of persons whose similarity based on the feature amounts is equal to or higher than the predetermined reference threshold value Th1 are present, the process proceeds to step S6. In step S6, it is determined whether or not the plurality of persons are the same person and whether or not the person is a main person. For example, when determination as a main person is made since the person appears in a predetermined number of images or more, in step S7, the feature amounts of a plurality of persons who are determined as the main person as well as the same person are integrated into one piece of data in a group. The integration of the feature amounts can be performed by calculating the average value of the feature amounts, for example.

Figure 6:
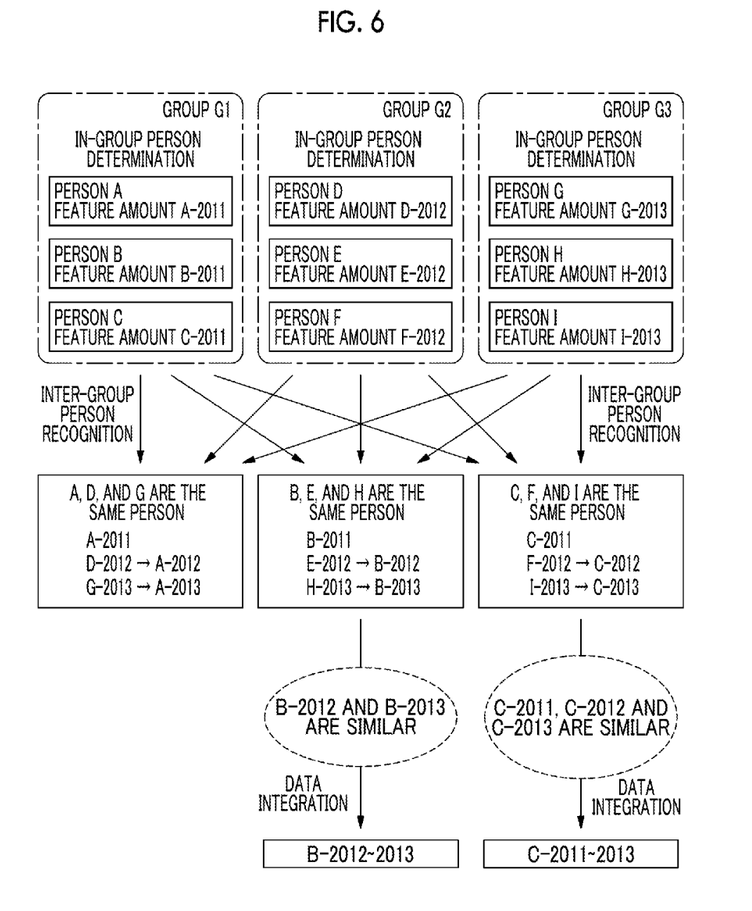
FIG. 6 is a diagram schematically showing the feature amounts processed by an in-group person determination section, an inter-group person recognition section, and a data integrating section.

For example, as shown in FIG. 6, it is assumed that in the group G1, three persons A, B, and C are determined as main persons and the feature amounts are integrated into A-2011, B-2011, and C-2011; in the group G2, three persons D, E, and F are determined as main persons and the feature amounts are integrated into D-2012, E-2012, and F-2012; and in the group G3, three persons H, and I are determined as main persons and the feature amounts are integrated into G-2013, H-2013, and I-2013. In this case, as shown in Table 1 below, nine main persons of the persons A to I appear over the entire period of 2011 to 2013. The persons A to I and the integrated feature amounts are stored in the data memory 4.

TABLE 1

| | Shooting date and time | | |
|---|---|---|---|
| | 2011 | 2012 | 2013 |
| Person A | Feature amount A-2011 | | |
| Person B | Feature amount B-2011 | | |
| Person C | Feature amount C-2011 | | |
| Person D | | Feature amount D-2012 | |
| Person E | | Feature amount E-2012 | |
| Person F | | Feature amount F-2012 | |
| Person G | | | Feature amount G-2013 |
| Person H | | | Feature amount H-2013 |
| Person I | | | Feature amount I-2013 |

Then, in step S8, the inter-group person recognition section 15 performs person recognition between adjacent groups. That is, the inter-group person recognition section 15 reads the predetermined recognition threshold value Th2 from the storage unit 3, and determines whether or not there are persons having a similarity of the predetermined recognition threshold value Th2 or higher between two groups having adjacent shooting dates and times based on the integrated feature amounts of the main persons stored in the data memory 4.

Then, when there are persons having a similarity of the predetermined recognition threshold value Th2 or higher between the groups, the process proceeds to step S9. In step S9, the persons are recognized as the same person between the two groups.

For example, as shown in FIG. 6, it is assumed that, in the groups G1 and G2 having adjacent shooting dates and times, the persons A and D are recognized as the same person since the similarity expressed by the difference between the feature amount A-2011 of the person A and the feature amount D-2012 of the person D is equal to or higher than the predetermined recognition threshold value Th2. In addition, it is assumed that, in the groups G2 and G3, the persons D and G are recognized as the same person since the similarity expressed by the difference between the feature amount D-2012 of the person D and the feature amount G-2013 of the person G is equal to or higher than the predetermined recognition threshold value Th2. In this case, since the persons A, D, and G are recognized as the same person, the titles of the feature amount D-2012 of the person D and the feature amount G-2013 of the person G can be replaced with the feature amounts A-2012 and A-2013 of the person A, respectively.

Similarly, since the persons B, E, and H are recognized as the same person, the titles of the feature amount E-2012 of the person E and the feature amount H-2013 of the person H can be replaced with the feature amounts B-2012 and B-2013 of the person B, respectively. In addition, since the persons C, F, and I are recognized as the same person, the titles of the feature amount F-2012 of the person F and the feature amount I-2013 of the person I can be replaced with the feature amounts C-2012 and C-2013 of the person C, respectively.

That is, although the presence of nine main persons of the person A to I is confirmed in steps S6 and S7, there are in fact three persons A, B and C. Therefore, the feature amounts of the persons A, B and C in each year of 2011 to 2013 can be written as shown in Table 2 below. Such rewritten titles of the feature amounts of the same person are also stored in the data memory 4.

TABLE 2

| | Shooting date and time | | |
|---|---|---|---|
| | 2011 | 2012 | 2013 |
| Person A | Feature amount A-2011 | Feature amount A-2012 (D-2012) | Feature amount A-2013 (G-2013) |
| Person B | Feature amount B-2011 | Feature amount B-2012 (E-2012) | Feature amount B-2013 (H-2013) |
| Person C | Feature amount C-2011 | Feature amount C-2012 (F-2012) | Feature amount C-2013 (I-2013) |

Once person recognition between groups is completed as described above, the process proceeds to step S10. In step S10, for the persons recognized as the same person between groups, the data integrating section 16 integrates the feature amounts in the two groups. That is, the data integrating section 16 reads the predetermined integration threshold value Th3 from the storage unit 3. Then, based on the feature amounts of the main person stored in the data memory 4, for the persons recognized as the same person between two groups having adjacent shooting dates and times, the data integrating section 16 calculates the difference between the feature amounts integrated in the two groups. Then, the data integrating section 16 determines whether or not the difference is equal to or less than the predetermined integration threshold value Th3.

When the difference between the feature amounts in the adjacent groups is equal to or less than the predetermined integration threshold value Th3, it is determined that the feature amount can be integrated, and the process proceeds to step S11. In step S11, both the feature amounts in the two groups are integrated into a piece of data.

For example, as shown in FIG. 6, assuming that the difference between the feature amounts B-2012 and B-2013 is equal to or less than the predetermined integration threshold value Th3 since the feature amount B-2012 of the person B in the group G2 and the feature amount B-2013 of the person B in the group G3 are approximate to each other, the feature amounts B-2012 and B-2013 are integrated into one piece of data B-2012~2013, which is the feature amount of the person B in the groups G2 and G3, that is, the feature amount of the person B over the period of 2012 to 2013. The integration of the feature amounts can also be performed by calculating the average value of the feature amounts, for example.

Similarly, assuming that the difference between the feature amount C-2011 of the person C in the group G1 and the feature amount C-2012 of the person C in the group G2 and the difference between the feature amount C-2012 of the person C in the group G2 and the feature amount C-2013 of the person C in the group G3 are equal to or less than the predetermined integration threshold value Th3, the feature amounts C-2011, C-2012, and C-2013 are integrated into one piece of data C-2011~2013, which is the feature amount of the person C in the groups G1, G2, and G3, that is, the feature amount of the person C over the period of 2011 to 2013.

In addition, it is assumed that, since all the differences between the feature amounts A-2011 to A-2013 of the person A in the groups G1 to G3 are larger than the predetermined integration value Th3, data integration cannot be performed. Similarly, it is assumed that, since the difference between the feature amount B-2011 of the person B in the group G1 and the feature amount B-2012 of the person B in the groups G2 is larger than the predetermined integration value Th3, the feature amount B-2011 in the group G1 and the feature amount B-2012~2013 integrated between the groups G2 and G3 cannot be integrated.

As a result, as shown in Table 3 below, the feature amount of the person A is expressed by three pieces of data of the feature amount A-2011 of 2011 corresponding to the group G1, the feature amount A-2012 of 2012 corresponding to the group G2, and the feature amount A-2013 of 2013 corresponding to the group G3. The feature amount of the person B is expressed by two pieces of data of the feature amount B-2011 of 2011 corresponding to the group G1 and the integrated feature amount B-2012~2013 of 2012 and 2013 corresponding to the groups G2 and G3. The feature amount of the person C is expressed as one integrated feature amount C-2011~2013 of 2011 to 2013 corresponding to the groups G1 to G3.

TABLE 3

| | Shooting date and time | | |
|---|---|---|---|
| | 2011 | 2012 | 2013 |
| Person A | Feature amount A-2011 | Feature amount A-2012 | Feature amount A-2013 |
| Person B | Feature amount B-2011 | Feature amount B-2012~2013 | |
| Person C | Feature amount C-2011~2013 | | |

The feature amounts integrated as described above are stored in the data memory 4.

When a target image for person recognition is added or when a person having an integrated feature amount appears in a new image group that is a target of person recognition, the feature amount stored in the data memory 4 can be effectively used to perform person recognition.

In addition, when the feature amount of the same person is observed in time series, if the rate of change of the feature amount is relatively low, person recognition can be performed based on the integrated feature amount. However, when the rate of change of the feature amount increases to exceed the predetermined recognition threshold value Th2, it is preferable to separate the feature amount as a feature amount of another period.

Then, when it is determined that a plurality of persons whose similarity based on the feature amount is equal to or higher than the predetermined reference threshold value Th1 are not present in step S5, it is determined that a main person does not appear on a plurality of images in a group, and the series of processes end.

In addition, when it is determined that there are no persons having a similarity of the predetermined recognition threshold value Th2 or higher between two groups having adjacent shooting dates and times in step S8, it is determined that there is no same person between the groups, and the series of processes end.

In addition, for the persons recognized as the same person between the adjacent groups, when the difference of the feature amounts between the groups is higher than the predetermined integration threshold value Th3 in step S10, it is determined that the data cannot be integrated in step S11, and the series of processes end.

As described above, according to the person recognition apparatus of the present embodiment, the group division section 12 divides a plurality of images sorted by shooting date and time by the sorting section 11 into a plurality of groups according to a predetermined shooting date and time range; the face recognition section 13 extracts feature amounts by face recognition for each group; the in-group person determination section 14 determines persons having a similarity of the predetermined reference threshold value Th1 or higher as the same person and integrates the feature amounts relevant to the person for each group; and the inter-group person recognition section 15 recognizes persons having a similarity of the predetermined recognition threshold value Th2 or higher as the same person between two groups based on the feature amounts integrated in adjacent groups. Therefore, it is possible to perform accurate person recognition according to a time dependent face change.

In addition, for the persons recognized as the same person between the adjacent groups, when the difference of the feature amounts between the groups is equal to or less than the predetermined integration threshold value Th3, the data integrating section 16 integrates the feature amounts. Therefore, it is possible to reduce the amount of data while suppressing the lowering of the accuracy of person recognition.

In addition, as the predetermined recognition threshold value Th2 used when the inter-group person recognition section 15 recognizes the same person between groups, it is possible to use the same value as the predetermined reference threshold value Th1 used when the in-group person determination section 14 determines the same person in a group. Alternatively, a different value from the predetermined reference threshold value Th1 can be used as the predetermined recognition threshold value Th2. For example, since the inter-group person recognition section 15 recognizes the same person between images having more separated shooting dates and times than when the in-group person determination section 14 does, the predetermined recognition threshold value Th2 between groups may be set to be slightly larger than the predetermined reference threshold value Th1 in a group.

In the embodiment described above, the predetermined shooting date and time range used when the group division section 12 divides a plurality of images into groups is set to 1 year. However, the predetermined shooting date and time range is not limited to 1 year and can be appropriately selected according to the entire shooting period of a plurality of images that are the target of person recognition, a person who is the target of person recognition, and the like.

For example, the features of the face of a child change in a short period of time compared to an adult. Therefore, when a person who is the target of recognition is a child, it is preferable to set the predetermined shooting date and time range to a short period, such as 6 months. In particular, in the case of a child in childhood, the predetermined shooting date and time range may be set to about 3 months or 4 months. Thus, it is possible to adjust the predetermined shooting date and time range according to the age of a person who is the target of recognition.

Similarly, the predetermined reference threshold value Th1 used when determining the same person in a group and the predetermined recognition threshold value Th2 used when recognizing the same person between groups can also be appropriately adjusted according to the age of a person who is the target of recognition.

In addition, the predetermined shooting date and time range, the predetermined reference threshold value Th1, and the predetermined recognition threshold value Th2 can be adjusted according to the race and sex of a person who is the target of recognition as well as the age. That is, according to at least one of the age, race, and sex of a person who is the target of recognition, it is possible to adjust the size of at least one of the predetermined shooting date and time range, the predetermined reference threshold value Th1, and the predetermined recognition threshold value Th2.

In addition, it is preferable to adjust the predetermined reference threshold value Th1 and the predetermined recognition threshold value Th2 according to the size of the predetermined shooting date and time range. For example, the predetermined reference threshold value Th1 and the predetermined recognition threshold value Th2 are adjusted so as to become smaller as the predetermined shooting date and time range becomes shorter.

In the embodiment described above, the recognition of the same person is performed by dividing a plurality of images into a plurality of groups according to the range of shooting date and time. However, it is also possible to estimate the shooting date and time of an image whose shooting date and time is not clear by tracking the same person continuously in the order of shooting date and time and figuring out the time dependent changes in the feature amounts.

In addition, it has been described in the above embodiment that the sorting section 11 sorts a plurality of images by shooting date and time, the group division section 12 divides the images into a plurality of groups according to the predetermined shooting date and time range, the face recognition section 13 extracts the feature amount by face recognition for each group, and the in-group person determination section 14 determines persons having a similarity of the predetermined reference threshold value Th1 or higher as the same person and integrates the feature amounts relevant to the person for each group. However, the invention is not limited to this. For example, a configuration can also be adopted in which the feature amounts of the face of each person are extracted by performing face recognition for all of a plurality of images, the extracted feature amounts and the shooting dates and times of the images are associated to create data, the feature amounts of each person are divided into groups according to a predetermined shooting date and time range, and person determination is performed for each group.

In addition, the person recognition apparatus shown in FIG. 1 can be formed using a computer. That is, the data processing unit 1 can be formed using a CPU and a person recognition program causing the CPU to execute each step of the flowchart shown in FIG. 2, and the person recognition program can be recorded on a computer readable recording medium. The data processing unit 1 may also be provided, for example, in the form of Software as a Service (SaaS) where an image input is received through the Internet. As the recording medium, it is possible to use various recording media, such as a hard disk, a flexible disk, an MO, an MT, a RAM, a CD-ROM, a DVD-ROM, an SD card, a CF card, a USB memory, and a data storage on the Internet.

What is claimed is:

1. A person recognition apparatus, comprising:
a feature amount extraction and classification processor that extracts feature amounts for respective persons by performing face recognition for a plurality of images and divides the extracted feature amounts for the respective persons into a plurality of groups based on respective shooting time periods of the plurality of images;
an in-group person determination processor that determines, within each of the plurality of groups, persons whose similarity based on the feature amounts extracted by the feature amount extraction and classification processor is equal to or higher than a first predetermined reference threshold value as the same person, and integrates the extracted feature amounts for each respective said same person into an integrated feature amount representing the respective said same person for each of the groups;
an inter-group person recognition processor that recognizes persons having a similarity of a second predetermined recognition threshold value or higher as the same person between two of said plurality of groups having adjacent said shooting time periods based on the integrated feature amounts from the in-group person determination section in the two groups; and
a data integrating processor that, for persons recognized as the same person between the two groups by the inter-group person recognition processor, further integrates both feature amounts integrated in the two groups when a difference between both the feature amounts is equal to or less than a third predetermined integration threshold value.

2. A person recognition apparatus comprising:
a feature amount extraction and classification processor that includes a sorting processor that sorts the plurality of images by respective shooting date and time, a group division processor that divides the plurality of images sorted by the sorting processor into a plurality of groups according to predetermined shooting time periods, and a face recognition processor that extracts a feature amount for each person by performing face recognition for each of the groups obtained by division of the group division processor;
an in-group person determination processor that determines, within each of the plurality of groups, persons whose similarity based on the feature amounts extracted by the feature amount extraction and classification processor is equal to or higher than a first predetermined reference threshold value as the same person, and integrates the extracted feature amounts for each respective said same person into an integrated feature amount representing the respective said same person for each of the groups;

an inter-group person recognition processor that recognizes persons having a similarity of a second predetermined recognition threshold value or higher as the same person between two of said plurality of groups having adjacent said shooting time periods based on the integrated feature amounts from the in-group person determination section in the two groups; and a data integrating processor that, for persons recognized as the same person between the two groups by the inter-group person recognition processor, further integrates both feature amounts integrated in the two groups when a difference between both the feature amounts is equal to or less than a third predetermined integration threshold value.

3. The person recognition apparatus according to claim 1, wherein, after feature amounts are integrated between the two groups having adjacent said shooting time periods by the inter-group person recognition processor, when a difference of integrated feature amounts between the two groups and another group having an adjacent said shooting time period is equal to or less than the third predetermined integration threshold value, the data integrating section integrates the integrated feature amount integrated between the two groups and a feature amount in said another group.

4. The person recognition apparatus according to claim 2, wherein, after feature amounts are integrated between the two groups having adjacent said shooting time periods by the inter-group person recognition processor, when a difference of integrated feature amounts between the two groups and another group having an adjacent said shooting time period is equal to or less than the third predetermined integration threshold value, the data integrating section integrates the integrated feature amount integrated between the two groups and a feature amount in said another group.

5. The person recognition apparatus according to claim 1, wherein the inter-group person recognition processor uses, as the second predetermined recognition threshold value, the same value as the first predetermined reference threshold value.

6. The person recognition apparatus according to claim 2, wherein the inter-group person recognition processor uses, as the second predetermined recognition threshold value, the same value as the first predetermined reference threshold value.

7. The person recognition apparatus according to claim 1, wherein the in-group person determination processor integrates feature amounts by calculating an average value of feature amounts relevant to a person determined as the same person.

8. The person recognition apparatus according to claim 2, wherein the in-group person determination processor integrates feature amounts by calculating an average value of feature amounts relevant to a person determined as the same person.

9. The person recognition apparatus according to claim 1, wherein the in-group person determination processor determines whether or not a person determined as the same person is a main person, and integrates feature amounts when it is determined that the person determined as the same person is a main person.

10. The person recognition apparatus according to claim 2, wherein the in-group person determination processor determines whether or not a person determined as the same person is a main person, and integrates feature amounts when it is determined that the person determined as the same person is a main person.

11. A person recognition method using a computer comprising:
extracting feature amounts for respective persons by performing face recognition for a plurality of images and dividing the extracted feature amounts for the respective persons into a plurality of groups based on respective shooting time periods of the plurality of images;

determining, within each of the plurality of groups, persons whose similarity based on the extracted feature amounts is equal to or higher than a first predetermined reference threshold value as the same person, and integrating the extracted feature amounts for each respective said same person into an integrated feature amount representing the respective said same person for each of the groups;

recognizing persons having a similarity of a second predetermined recognition threshold value or higher as the same person between two of said plurality of groups having adjacent said shooting time periods based on the integrated feature amounts from the two groups; and for persons recognized as the same person between the two groups by the recognizing step, further integrating both feature amounts integrated in the two groups when a difference between both the feature amounts is equal to or less than a third predetermined integration threshold value.

12. The person recognition method according to claim 11, wherein a size of at least one of the respective shooting time periods, the first predetermined reference threshold value, and the second predetermined recognition threshold value is adjusted according to at least one of age, race, and sex of a person who is a target of recognition.

13. The person recognition method according to claim 11, wherein a size of at least one of the first predetermined reference threshold value and the second predetermined recognition threshold value is adjusted according to the respective shooting time periods.

14. The person recognition method according to claim 12, wherein a size of at least one of the first predetermined reference threshold value and the second predetermined recognition threshold value is adjusted according to the respective shooting time periods.

15. A non-transitory computer readable recording medium storing a person recognition program causing a computer to execute:
a step of extracting feature amounts for respective persons by performing face recognition for a plurality of images and dividing the extracted feature amounts for the respective persons into a plurality of groups based on respective shooting time periods of the plurality of images;

a step of determining, within each of the plurality of groups, persons whose similarity based on the extracted feature amounts is equal to or higher than a first predetermined reference threshold value as the same person, and integrating the extracted feature amounts for each respective said same person into an integrated feature amount representing the respective said same person for each of the groups; and a step of recognizing persons having a similarity of a second predetermined recognition threshold value or higher as the same person between two of said plurality of groups having adjacent said shooting time periods based on the integrated feature amounts from the two groups; and for persons recognized as the same person between the two groups by the step of recognizing, further integrating both feature amounts integrated in the two groups when a difference between both the feature amounts is equal to or less than a third predetermined integration threshold value.

* * * * *